United States Patent [19]
Billings et al.

[11] Patent Number: 5,653,288
[45] Date of Patent: *Aug. 5, 1997

[54] CONTAMINANT REMEDIATION, BIODEGRADATION AND VOLATILIZATION METHODS AND APPARATUSES

[76] Inventors: Jeffery F. Billings, 12415 N. 68th Pl., Scottsdale, Ariz. 85254; Gale K. Billings, 8905 Osuna Rd., NE., Albuquerque, N. Mex. 87111

[*] Notice: The term of this patent shall not extend beyond the expiration date of Pat. No. 5,472,294.

[21] Appl. No.: 567,543

[22] Filed: Dec. 5, 1995

Related U.S. Application Data

[60] Division of Ser. No. 179,584, Jan. 10, 1994, Pat. No. 5,472,294, which is a continuation-in-part of Ser. No. 800,545, Nov. 27, 1991, Pat. No. 5,277,518, which is a continuation-in-part of Ser. No. 712,919, Jun. 7, 1991, Pat. No. 5,221,159, which is a continuation-in-part of Ser. No. 500,767, Mar. 28, 1990, abandoned.

[51] Int. Cl.$^6$ .............................. E21B 23/00; E21B 43/22
[52] U.S. Cl. ...................... 166/305.1; 166/310; 166/381
[58] Field of Search ................................... 166/227, 246, 166/305.1, 310, 381; 210/610; 405/128–131, 258; 435/248, 249, 266, 313

[56] References Cited

U.S. PATENT DOCUMENTS

| | | |
|---|---|---|
| Re. 33,102 | 10/1989 | Visser et al. .................. 588/267 |
| 632,388 | 9/1899 | Whitehead ..................... 405/131 |
| 2,523,091 | 9/1950 | Bruce .......................... 166/185 |
| 2,969,226 | 1/1961 | Huntington ..................... 166/271 |
| 3,216,905 | 11/1965 | Baptist ......................... 435/266 |
| 3,351,132 | 11/1967 | Dougan et al. ................... 166/266 |
| 3,665,716 | 5/1972 | Rogers et al. ................... 405/128 |
| 3,678,999 | 7/1972 | Kulikov et al. .................. 166/236 |
| 3,743,582 | 7/1973 | Kitai et al. .................... 435/248 |

(List continued on next page.)

FOREIGN PATENT DOCUMENTS 3427532  8/1985  Germany .................. 405/131

OTHER PUBLICATIONS

Billings & Assoc., "SVVS Remediation Technology" (1990).
Billings & Assoc., "Developments in Remediation" (1990).
Coia, et al., "Soil Decontamination Through in Situ Air Stripping of Volatile Organics—A Pilot Demo.", *Proceedings of the Nat'l Water Well Assn/Amer. Pet. Inst. Conf.*, pp. 555–564 (1985).
Dickinson, et al., "Radial Wells and Hazardous Waste Sites," *RCRA Site Remediation*, pp. 232–237 (no date).
Gudemann, et al., "In Situ Remediation of VOC Contaminated Soil and Groundwater by Vapor Extraction and Groundwater Aeration," *Haztec International '88*, Conference Proceedings, pp. 2A–90 through 2A–111 (1988).

(List continued on next page.)

*Primary Examiner*—John A. Ricci
*Attorney, Agent, or Firm*—Deborah A. Peacock; Donovan F. Duggan

[57] ABSTRACT

Methods and apparatuses for removing contaminants. At least one injection well is drilled through the vadose zone to a depth below the water table defining the upper boundary of the aquifer. A plurality of venting wells or venting laterals are established to a depth above the water table sufficient to discourage fouling by contaminated water or condensate, and oxygenated substances are injected under pressure through the injection wells. Additional biochemical cleansing may occur at ground level prior to venting of contaminated air. Microbes natural to the contaminated site may be extracted, analyzed, fermented, and reintroduced to enhance biodegradation, and nutrients, food, or both, may be supplied to the microbial population to sustain high levels of degradation activity. Relatively pure liquid contaminant may be separated from other fluids, such as water. Modes of enhancing the lateral dispersion of injected substances are disclosed, for example, hingedly connected radially extendible injection tubes which expand the radius of injection.

7 Claims, 11 Drawing Sheets

U.S. PATENT DOCUMENTS

| | | | |
|---|---|---|---|
| 3,828,525 | 8/1974 | Copa et al. | 95/237 |
| 3,846,290 | 11/1974 | Raymond | 210/610 |
| 4,026,355 | 5/1977 | Johnson et al. | 166/246 |
| 4,126,556 | 11/1978 | Swanson et al. | 210/242.4 |
| 4,183,407 | 1/1980 | Knopik | 166/370 |
| 4,241,787 | 12/1980 | Price | 166/105 |
| 4,249,605 | 2/1981 | Slater et al. | 166/266 |
| 4,289,204 | 9/1981 | Stewart | 166/303 |
| 4,296,810 | 10/1981 | Price | 166/265 |
| 4,303,127 | 12/1981 | Freel et al. | 166/266 |
| 4,323,122 | 4/1982 | Knopik | 588/228 |
| 4,358,221 | 11/1982 | Wickberg | 588/259 |
| 4,401,569 | 8/1983 | Jhaveri et al. | 210/610 |
| 4,435,292 | 3/1984 | Kirk et al. | 210/747 |
| 4,442,901 | 4/1984 | Zison | 166/369 |
| 4,469,176 | 9/1984 | Zison et al. | 166/369 |
| 4,518,399 | 5/1985 | Croskell et al. | 95/51 |
| 4,544,381 | 10/1985 | Schmidt | 435/266 |
| 4,588,506 | 5/1986 | Raymond et al. | 210/606 |
| 4,593,760 | 6/1986 | Visser et al. | 166/267 |
| 4,660,639 | 4/1987 | Visser et al. | 588/228 |
| 4,662,900 | 5/1987 | Ottengraf | 435/266 |
| 4,713,343 | 12/1987 | Wilson, Jr. et al. | 435/264 |
| 4,723,968 | 2/1988 | Schippert et al. | 95/205 |
| 4,730,672 | 3/1988 | Payne | 166/266 |
| 4,745,850 | 5/1988 | Bastian et al. | 454/240 |
| 4,765,902 | 8/1988 | Ely et al. | 210/610 |
| 4,778,010 | 10/1988 | Knecht et al. | 166/261 |
| 4,806,148 | 2/1989 | Ottengraf | 55/223 |
| 4,832,122 | 5/1989 | Corey et al. | 166/266 |
| 4,842,448 | 6/1989 | Koerner et al. | 405/258 |
| 4,850,745 | 7/1989 | Hater et al. | 405/258 |
| 4,872,994 | 10/1989 | Jakob | 210/691 |
| 4,890,673 | 1/1990 | Payne | 166/266 |
| 4,927,292 | 5/1990 | Justice | 405/43 |
| 4,982,788 | 1/1991 | Donnelly | 405/131 |
| 5,067,852 | 11/1991 | Plunkett | 405/128 |
| 5,076,727 | 12/1991 | Johnson et al. | 405/128 |
| 5,080,793 | 1/1992 | Urlings | 210/603 |
| 5,116,163 | 5/1992 | Bernhardt | 405/128 |
| 5,133,625 | 7/1992 | Albergo et al. | 405/263 |
| 5,221,159 | 6/1993 | Billings et al. | 405/128 |
| 5,277,518 | 1/1994 | Billings et al. | 405/128 |
| 5,348,420 | 9/1994 | Bernhardt | 405/52 |
| 5,472,294 | 12/1995 | Billings et al. | 405/128 |

OTHER PUBLICATIONS

Marley, "Air Sparging in Conjunction with Vapor Extraction for Source Removal at VOC Spill Cites", *5th Nat'l Outdoor Action Conf.*, Nat'l Water Well Assn., pp. 89–101.

Regalbuto, et al., "In Situ Removal of VOC's by Means of Enhanced Volatilization," *Proc. Petrol. Hydrocarbons and Organic Chem. in Ground Water*, Assn. of Ground Water Sci., pp. 571–590 (1988).

Rogoshewski, et al., "Remedial Action Technology for Waste Disposal Sites," Noyes Data Corporation, pp. 258–269 (1983).

Yaniga, et al., "Restoration of Water Quality in a Multiaquifer System Via In Situ Biodegradation of the Organic Contaminants," *5th Nat'l Symp.*, Nat'l Water Well Assn., pp. 510–526 (1985).

Periodical: "Air Sparging Improves Effectiveness of Soil Vapor Extraction Systems," *The Hazardous Waste Consultant*, vol. 9, Issue 2, pp. 1.1–1.4 (Mar./Apr. 1991).

Incomplete article, title unknown, *Hydro Processing*, Oct. 1986 pp. 42–46.

Brown, R. A., et al., "Aquifer Restoration with Enhanced Bioreclamation," *Pollution Engineering*, Nov. 1985 pp. 25–28.

Jafek, Bev, "VOC Air Stripping Cuts Costs," *Waste Age*, Oct. 1986 pp. 66–67.

Feature: "Groundwater Contamination: An Industry Update", pp. 54–58 text only.

Koltunlak, D.L., "In–Situ Air Stripping Cleans Contaminated Soil," *Chemical Engineering*, Aug. 18, 1986 pp. 30–31.

Anastos, G., et al., "A New Technique for Removing Volatile Organic Contaminants from Soils," *The Wston Way* magazine, Winter/Spring 1986, pp. 20–24.

Staff, "Contaminated Soil Treatment System Removes VOCs in EPA Cleanup," *Chemical Processing*, Apr. 1986, pp. 123–124.

Absalon, J.R., et al., "Treatment Alternatives Evaluation for Equifer Restoration",: pp. 98–104 (1983).

Barker, J.R., et al., "Attenuation by Biotransformation of Gasoline Derived Hydrocarbons in Permeable Sand Aquifers," pp. 1–45 (1986).

Brown, R.A., et al., "Oxygen Transport in Contaminated Aquifers with Hydrogen Peroxide," *National Water Well Association*, pp. 441–450 (1984).

Kaback, Dawn, et al., "Horizontal Wells for In–Situ Remediation of Groundwater and Soils," *National Water Well Association*, pp. 121–135 (May 1989).

Marley, Michael, et al., "Induced Soil Venting for Recovery/Restoration of Gasoline Hydrocarbons in Vadose Zone," [Master's Thesis] pp. 473–503 (1984).

Ryan, John R., et al., "Bioremediation of Organic Contaminated Soil," pp. 31, 33–45 (Feb. 1991).

Swallow, June A., et al., "Volatilization of Organic Compounds from Unconfined Aquifers,"pp. 327–333 (May 1983).

Wilson, David J., "Soil Clean Up by In–Situ Aeration," *Marcel Dekker, Inc.*, pp. 991–1037 (1988).

Yaniga, Paul. et al., "Restoration of Water Quality in Multiaquifer System Via Insitu Biodegradation of the Organic Contaminants," *National Water Well Association, Dublin, Ohio*, pp. 510–526 (May 1991).

"Review of Six Technologies for In Situ Bioremediation Dissolved Btex in Groundwater," *Burlington Envir. Tech. Office, Burlington, Ontario CAN*, pp. i–ii, (Mar. 1992).

"Soil Impacted by Motor Fuels: A Literature Review," *American Petroleum Institute*, p. 38 (Jun. 1987).

"Conference on Petroleum Hydrocarbons and Organic Chemicals in Ground Water Prevention, Detection and Restoration", *National Water Well Association*, topic index (Nov. 1985).

"Conference on Petroleum Hydrocarbons and Organic Chemicals in Ground Water—Prevention, Detection and Restoration", *National Water Well Association*, topic index (Nov. 1986).

"Conference on Petroleum Hydrocarbons and Organic Chemicals in Ground Water—Prevension, Detection and Restoration", *National Water Well Association*, topic index (Nov. 1987).

"Conference on Petroleum Hydrocarbons and Organic Chemicals in Ground Water: Prevention, Detection and Restoration," *National Water Well Association*, topic index (Nov. 1988).

5,653,288

CONTAMINANT REMEDIATION, BIODEGRADATION AND VOLATILIZATION METHODS AND APPARATUSES

CROSS-REFERENCE TO RELATED APPLICATIONS

This application is a divisional application from U.S. patent application Ser. No. 08/179,584 to Jeffery F. Billings, et al., filed on Jan. 10, 1994 (issuing as U.S. Pat. No. 5,472,294 on Dec. 5, 1995), which is a continuation-in-part application of U.S. patent application Ser. No. 07/800,545 to Jeffery F. Billings and Gale K. Billings, filed on Nov. 27, 1991 (issued as U.S. Pat. No. 5,277,518), entitled Contaminant Remediation, Biodegradation and Removal Methods and Apparatuses, which is a continuation-in-part application of U.S. patent application Ser. No. 07/712,919, entitled Subsurface Remediation, Biodegradation and Extraction Methods and Apparatuses, to Jeffery F. Billings and Gale K. Billings, filed on Jun. 7, 1991 (issued as U.S. Pat. No. 5,221,159) which is a continuation-in-part application of U.S. patent application Ser. No. 07/500,767, entitled Subsurface Volatilization Method and System, to Jeffery F. Billings, filed on Mar. 28, 1990, now abandoned, the teachings all of which are incorporated herein by reference.

BACKGROUND OF THE INVENTION

1. Field of the Invention (Technical Field)

The present invention relates generally to methods and apparatuses for in situ remediation of organic contaminants, such as hydrocarbons, and inorganic contaminants, such as metals, from subsurface soil and ground water. In situ remediation of excavated materials and surface spills of liquid contaminants also may be conducted utilizing the present invention.

2. Background Art

The background of the present inventions is discussed in depth in U.S. patent application Ser. No. 07/712,919, entitled Subsurface Remediation, Biodegradation and Extraction Methods and Apparatuses, to Jeffery F. Billings and Gale K. Billings, filed on Jun. 7, 1991, and in U.S. patent application Ser. No. 07/500,767, entitled Subsurface Volatilization Method and System, to Jeffery F. Billings, filed on Mar. 28, 1990, now abandoned, the teachings of both of which are incorporated herein by reference.

The vacuum extraction inventions disclosed in the above two applications (and all known vacuum extraction systems) have, due to the use of extraction wells having perforations near the bottom thereof, encountered problems with the upwelling or condensation of contaminated subsurface water into the extraction wells, and concomitant fouling of the extraction wells and pumps, thus necessitating expensive surface water treatment equipment. The present invention solves this problem in a number of ways, while enhancing remediation.

Additionally, as disclosed herein, the liquid contaminant extraction apparatus and method of U.S. patent application Ser. No. 07/712,919 may be employed to remove contaminants from surface waters, such as lakes, rivers, seas, and oceans.

Furthermore, as disclosed herein, the volatilization inventions employing injection wells disclosed in U.S. applications Ser. Nos. 07/712,919 and 07/500,767 may be used with or without extraction wells.

SUMMARY OF THE INVENTION

(DISCLOSURE OF THE INVENTION)

The present invention comprises in situ methods and apparatuses for removal of contaminants from soil or from ground water, or both.

The first method and apparatus comprises establishing in situ at least one venting well having gas-permeable openings at an upper portion thereof, whereby volatile contaminants in the ground water or soil are removed through the venting well. In the preferred embodiment, at least one injection well is established in situ and an oxygen-containing substance, such as a gas or fluid, is injected into the injection well. Optionally, a vacuum is applied to the venting well. Preferably, the venting well and the injection well are within two hundred feet of one another and make up a well nest. The injection well, depending on site stratigraphy, is preferably within ten feet of the venting well and may be adjacent the venting well within a same bore hole. Preferably, the oxygen-containing gas is heated by solar heating, the venting well comprises a condensate drain at a lower end thereof, and microorganisms and nutrients, food, or both, are provided to a subsurface contaminated zone. The invention may additionally comprise sampling soil or water, isolating at least one microorganism useful in biodegrading the contaminants, fermenting the isolated microorganisms to increase their population, and inserting the fermented microorganisms into the subsurface. The invention may also comprise providing an elongated tube reservoir capped at one end (preferably to the bore hole of a venting well, an injection well, or both), providing entry ports in the elongated tube reservoir, surrounding the entry ports with filtration means, and collecting contaminants in the elongated tube reservoir by passage thereof through the filtration means. The invention may further comprise impregnating water with microorganisms useful in biodegradation of the contaminant, confining the impregnated water to one or more containers, and bubbling contaminants from the venting well through the impregnated water within the containers. Preferably, the venting well additionally comprises gas-permeable but low capillary-lift fill material below the gas-permeable openings in the venting well.

The second method and apparatus of the invention comprises: establishing in situ a venting lateral comprising gas-permeable openings therein; establishing in situ a plurality of injection wells; and injecting oxygen-containing gas or other substance into the injection wells; whereby volatile contaminants in the ground water or soil are removed through the venting lateral. Optionally, a vacuum is applied to the venting lateral. Preferably, the venting lateral and the injection well are within two hundred feet of one another and make up a well nest, the oxygen-containing gas or other substance is heated by solar heating, and microorganisms and nutrients, food, or both, are provided to the subsurface. The invention may additionally comprise sampling soil or water, isolating at least one microorganism useful in biodegrading the contaminants, fermenting the isolated microorganisms to increase their population, and inserting the fermented microorganisms into the subsurface. The invention may also comprise providing an elongated tube reservoir capped at one end (preferably to an injection well), providing entry ports in the elongated tube reservoir, surrounding the entry ports with filtration means, and collecting contaminants in the elongated tube reservoir by passage thereof through the filtration means. The invention may further comprise impregnating water with microorganisms useful in biodegradation of the contaminant, confining the impregnated water to one or more containers, and bubbling contaminants from the venting well through the impregnated water within the containers. Preferably, the venting well additionally comprises one or more vertical vents beneath the gas-permeable openings of the venting lateral. The vertical vent may be a gas-permeable chimney of sand or a venting well having gas-permeable openings therein and, optionally, being fluidly connected to the venting lateral, or a combination of the two types (a venting well extending partially down a sand chimney).

The third method and apparatus of the invention comprises: establishing in situ a venting lateral comprising gas-permeable openings therein; and placing a vertical vent beneath the venting lateral; whereby volatile contaminants in the ground water or soil are removed through the venting lateral. In the preferred embodiment, at least one injection well is established in situ and oxygen-containing substance, such as a gas, is injected into the injection well. Optionally, a vacuum is applied to the venting lateral. Preferably, the venting lateral and the injection well are within two hundred feet of one another and make up a well nest, the oxygen-containing gas is heated by solar heating, and microorganisms and nutrients, food, or both, are provided to the subsurface. The invention may additionally comprise sampling soil or water, isolating at least one microorganism useful in biodegrading the contaminants, fermenting the isolated microorganisms to increase their population, and inserting the fermented microorganisms into the subsurface. The invention may also comprise providing an elongated tube reservoir capped at one end (preferably to an injection well), providing entry ports in the elongated tube reservoir, surrounding the entry ports with filtration means, and collecting contaminants in the elongated tube reservoir by passage thereof through the filtration means. The invention may further comprise impregnating water with microorganisms useful in biodegradation of the contaminant, confining the impregnated water to one or more containers, and bubbling contaminants from the venting well through the impregnated water within the containers. Preferably, the vertical vent is beneath the gas-permeable opening of the venting lateral. The vertical vent may be a gas-permeable chimney of sand or a venting well having gas-permeable openings therein and, optionally, being fluidly connected to the venting lateral, or a combination of the two types (a venting well extending partially down a sand chimney).

The fourth method and apparatus of the invention comprises: establishing in situ at least one injection well into the ground water; injecting oxygen-containing substance, such as a gas, into the injection well to volatilize and biodegrade contaminants in the ground water and soil; and permitting upward migration of the volatilized and biodegraded contaminants without one or more venting conduits. In other words, no venting wells, venting laterals, or equivalent equipment is used. Preferably, the oxygen-containing gas is heated by solar heating and microorganisms and nutrients, food, or both, are provided to the subsurface. The invention may additionally comprise sampling water or soil, isolating at least one microorganism useful in biodegrading the contaminants, fermenting the isolated microorganisms to increase their population, and inserting the fermented microorganisms into the subsurface. The invention may also comprise providing an elongated tube reservoir capped at one end (preferably to an injection well), providing entry ports in the elongated tube reservoir, surrounding the entry ports with filtration means, and collecting contaminants in the elongated tube reservoir by passage thereof through the filtration means.

The invention optionally may comprise the use of an expander apparatus which permits lateral injection of substances radially outward from the well bore. One or more hollow radial injection tubes may be connected to a source of injected substances, placed down-well in a vertical disposition, and then pivoted through a vertical angle radially outward from the well. The pivoting of the radial injection tubes gives them a variable degree of horizontal disposition, so that substances may be forced through them radially outward from the well to enhance injection efficiency.

In all embodiments, the rate of biodegradation is controllable by varying the oxygen available to the biodegrading organisms. By deliberately manipulating the available oxygen, the user is able to increase or suppress the rate of bio-organism reproduction and metabolism, with a corresponding effect upon the rate of biodegradation of contaminants.

Accordingly, a primary object and purpose of the present invention is to provide an improved method and associated system for removing contaminants which does not suffer from the deleterious effects of upwelling and condensation of contaminated liquid water.

Another object of the present invention is to remove contaminants from a subsurface aquifer and from surface water, the contaminants being removed in relatively pure form.

An additional object of the present invention is to provide a method and system of removal of contaminants from subsurface soil as well as from ground water.

Another object and purpose of the present invention is to provide a relatively inexpensive method and system for in situ removal of contaminants from subsurface ground water and soil, as well as from surface waters.

A primary advantage of the present invention is that it is relatively inexpensive, efficient, and quick because of the combination of technologies employed.

An additional advantage of the present invention is that it integrates simultaneous remediation of free-product, soil residual, vapors, and contaminated ground water. If the invention is operated in the subsurface, these processes take place in: (a) the vadose zone; (b) the capillary fringe zone between the vadose zone and the water table; (c) at the water table; and (d) below the water table, synchronously. It does so by synchronous attack upon each of the physical and chemical characteristics of the four types of contamination. The invention is also operable above ground, for example, on excavated materials.

Yet another advantage of the present invention is that contaminated air may either be vented or treated before venting.

An additional advantage of the present invention is that liquid hydrocarbon contaminant may be removed from contaminated water such that the hydrocarbon contaminant is pure enough to be refined rather than handled as a toxic waste.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENTS (BEST MODES FOR CARRYING OUT THE INVENTION)

The present invention relates to methods and apparatuses for remediating, biodegrading, and extracting organic and inorganic contaminants.

The air-injection methods and apparatuses of the present invention are preferably employed to remove contaminants from subsurface soil and ground water by physical, chemical, and biological means, in situ. However, the same methods and apparatuses may be employed in man-made landfills, with excavated soils, to directly treat industrial wastes, and the like. The air-injection/air-venting systems of the invention may be combined with bio-treatment of contaminated gases prior to venting, extraction of contaminants from water, injection of contaminant-consuming microbes into the contaminants, and growth stimulation of natural or injected microbes by subsurface injection of nutrients (predominantly inorganic compounds), food (predominantly organic compounds), or both.

The liquid contaminant extraction method and apparatus of the invention is preferably used to remove free liquid contaminants from subsurface water. However, the invention may also be used to remove liquid contaminants from surface waters. For example, the invention may be used to assist in remediation of hydrocarbon spills (e.g., from an oil tanker spill) so as to recover contaminants which are thereafter relatively pure and therefore commercially useful.

Figure 1:
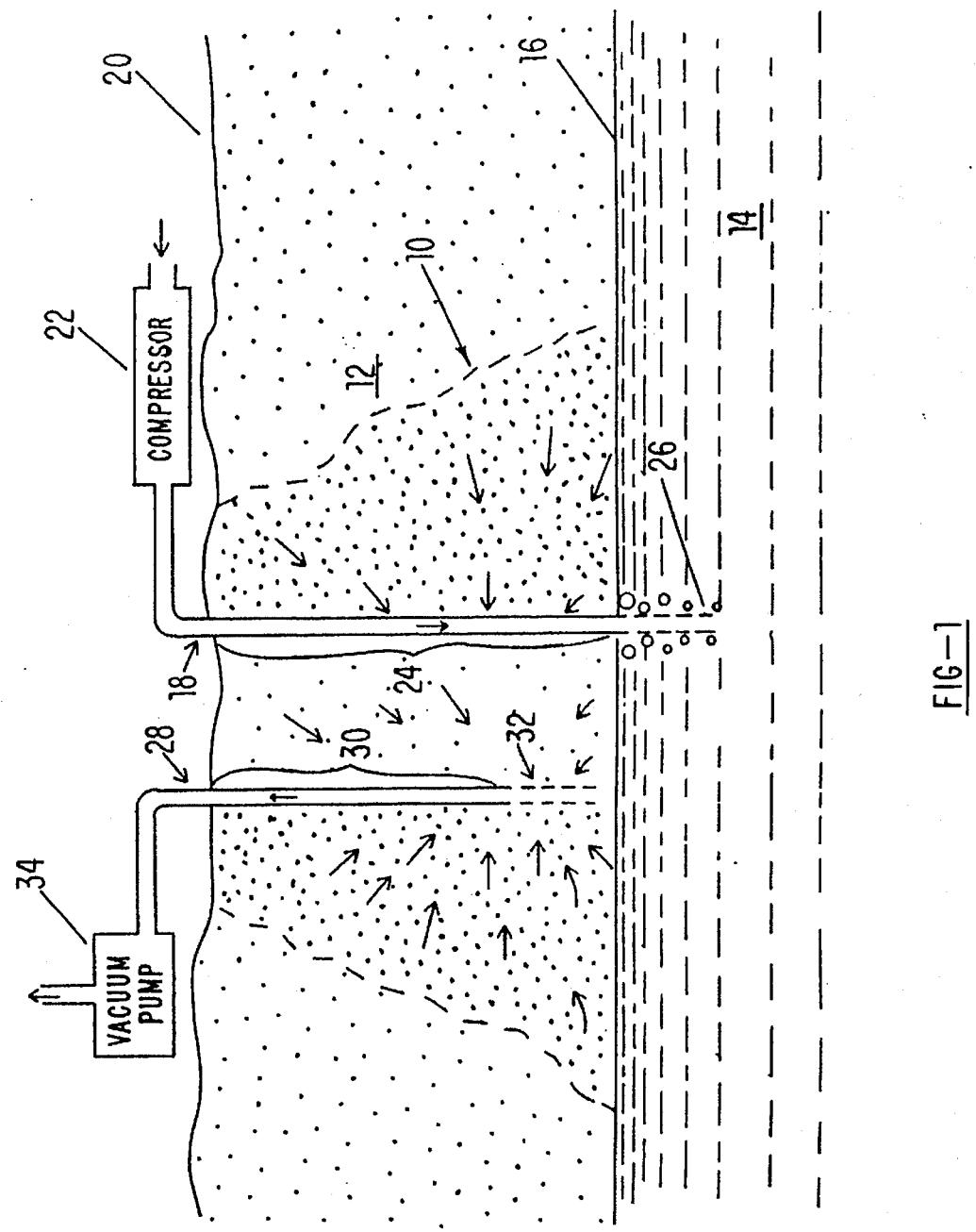
FIG. 1 is a schematic illustration in cross-section of a subterranean soil formation having a water table, and wherein the method and system of the present invention are being applied.
Figure 2:
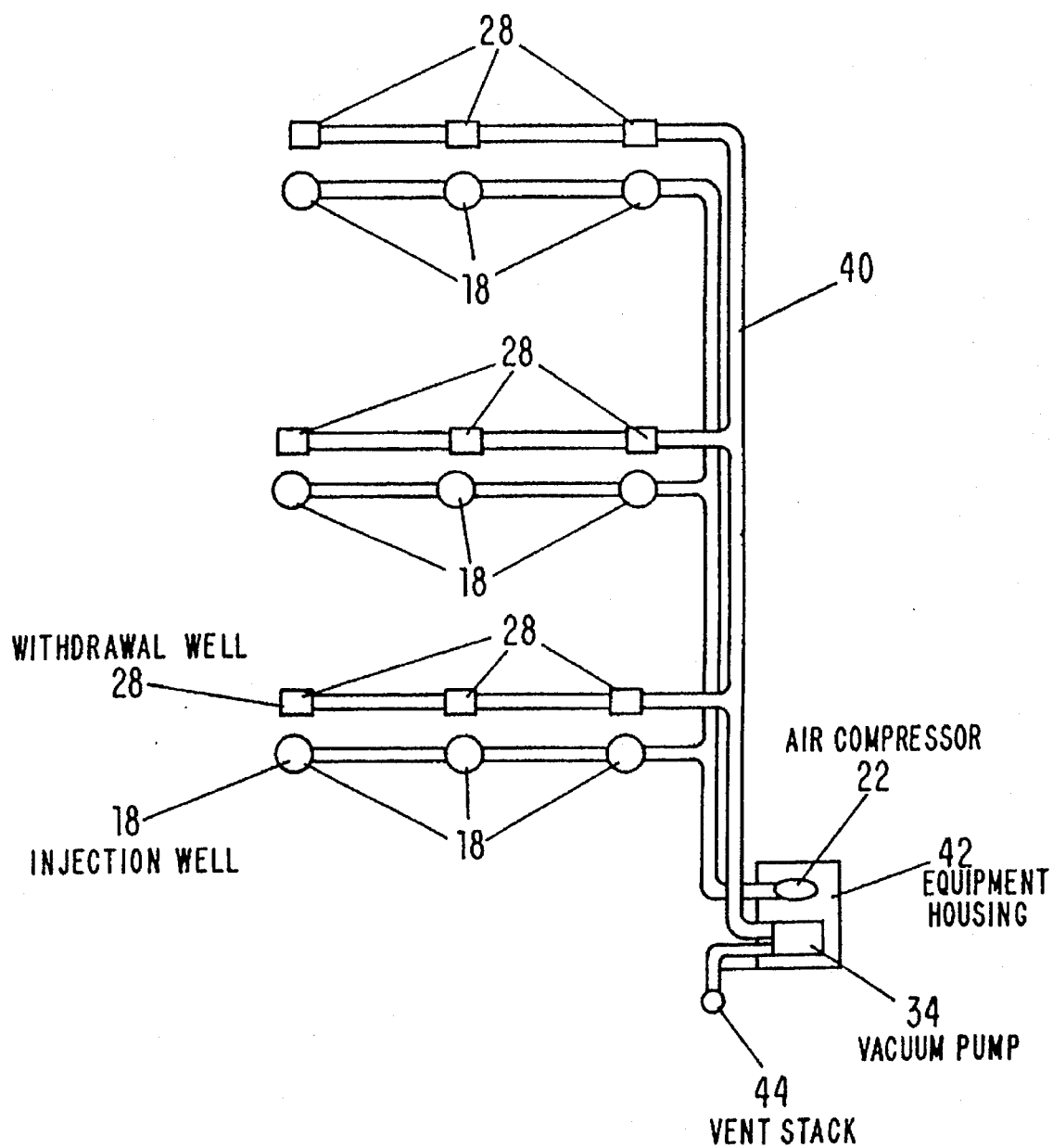
FIG. 2 is a plan view of an array of wells connected to a single compressor/vacuum pump station.
Figure 3:
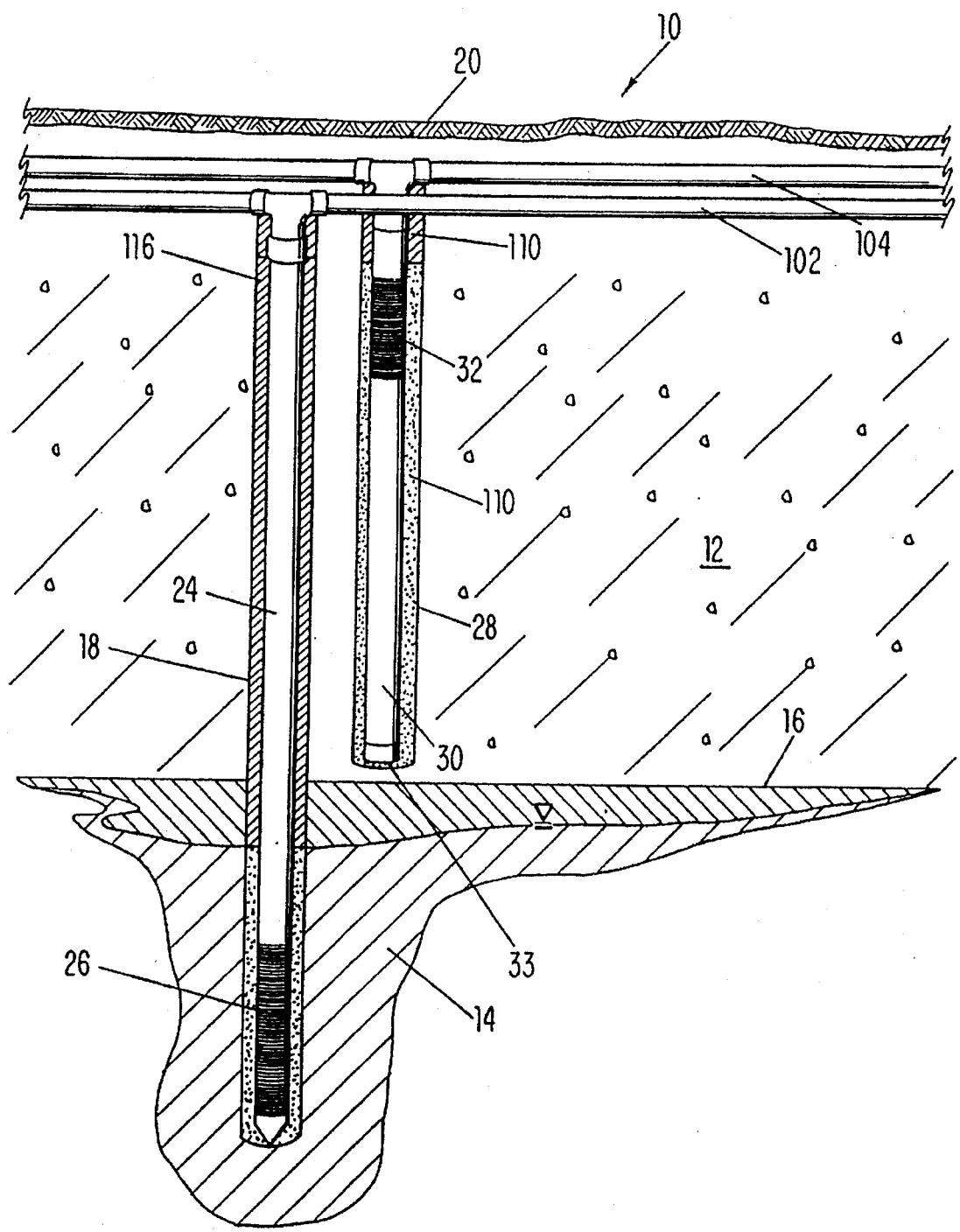
FIG. 3 is a schematic illustration in cross-section of a subterranean soil formation having a water table, wherein the preferred method and system of the present invention are being applied.

Referring to FIGS. 1 and 3, the preferred embodiment of the present air-injection invention is illustrated therein as directed to the remediation of a contaminated site 10, wherein there is a vadose zone 12 overlying a ground water reservoir or aquifer 14. The contamination will be present in the ground water reservoir or aquifer 14 and in the vadose zone 12. The upper boundary of the aquifer 14 is defined by the level of the water table 16. It will be recognized that there may be a capillary zone (not shown separately) above the water table 16, in which water is drawn upwardly into the vadose zone 12 by capillary action, and the term "vadose zone" is intended to cover this capillary zone. In general, the capillary zone will be contaminated if the ground water itself is contaminated.

In the preferred embodiment, a plurality of injection wells 18 extend from the ground surface 20 to a level beneath the water table 16 into the aquifer 14. The injection wells 18 are connected to an air compressor 22 via manifold 102. The air compressor 22 preferably has a capacity of at least approximately 10 to 300 cubic feet per minute (cfm) at 1 to 100 pounds per square inch (psi). Air or other oxygen-containing gas or fluid is introduced into the injection well 18 via the air compressor 22. The term "air," as used throughout the specification, is intended to include oxygen-containing gases.

Other oxygen-containing substances besides air or other oxygen-containing gases may alternatively be employed in the successful practicing of the invention. The bioremediation aspect of the invention includes the introduction of substances into the subsurface to augment the oxygen available for microbial metabolism. Oxygen-containing fluids, including liquids, may be used. Non-limiting examples of oxygen-containing fluids useable in the invention are liquid peroxides (e.g., hydrogen peroxide) and aqueous or other solutions of nitrate or sulfate compounds. Similarly, solid substances or mixtures of substances which contain biochemically available oxygen (perhaps after dissolution in water) may be introduced directly into an injection well 18. For example, solids (generally powdered) such as $NO_x$ and/or $SO_x$ compounds (e.g., nitrates and sulfates), or various peroxides which are solid at standard conditions of temperature or pressure (e.g., calcium peroxide) may be introduced into injection wells 18 to augment available oxygen.

The injection wells 18 are preferably made of common materials such as polyvinyl chloride (PVC). Injection wells are completed and emplaced using common well methodology. The injection wells 18 preferably include a gas-impermeable well liner 24, such as a PVC pipe, along the major part of its length. The injection well 18 extends to a depth of preferably one to 100 feet beneath the water table 16. The depth of penetration below the water table 16 depends on the thickness or extent of the contaminated portion of the ground water aquifer 14. Air, or other oxygen-containing substance, is introduced into the injection well 18 and exits the injection well 18 through a screen 26 or other perforated material, of a common manufactured type, into the aquifer 14 at the chosen depth.

The end of the injection well 18 in the aquifer 14 contains openings, such as from a gravel-packed, 10–40 slot screen 26 or piping with holes or perforations. The screen 26 functions as a sparger to introduce pressurized air into the aquifer 14, so as to stimulate circulation of the water and mixture of the air and water. Injection is accomplished at low to moderate air pressures.

Venting wells 28 are located in the vadose zone 12 within a predetermined distance from an injection well 18. The relative distance in both the horizontal and vertical dimensions between injection wells 18 and venting wells 28 is critical to proper operation of the present system. These distances are chosen based on site characteristics. This "well nesting" is discussed in detail in the '919 application. There may be "nests" having a plurality of extraction wells for each injection well, a plurality of injection wells for each extraction well, or pairs of injection/extraction wells (from 200 feet apart to within the same boreholes). A venting well 28 includes a gas-impermeable pipe 30 along the major portion of its length, with a space between the pipe 30 and the well hole. The upper end of venting well 28 contains perforations or openings 32, such as a sparger from a gravel packed, 10–40 slot aperture size well screen or piping with holes in it. The lower portion of venting well 28 comprises fill material 110 packed around pipe 30. Fill material 110 is preferably relatively permeable to air and other gases yet having low-capillary lift properties. Preferably, fill material 110 is silica sand. Such fill material 110 permits air and contaminants to pass up venting well 28 and through screen 32 yet resists upwelling and condensation of contaminated, liquid, ground water, which are typically present in prior art venting wells perforated at the lower end, and prevents clogging of openings 32 and fouling of vacuum pumps 34, where employed. Preferably, the lower portion of venting well 28 additionally comprises a condensate drain which releases condensate back into the vadose zone rather than accumulating condensate at the bottom of venting well 28.

Venting wells 28 may be, but need not be, connected to a fan or vacuum pump 34 via manifold 104. If employed, the fan or vacuum pump 34 is preferably of a capacity of 10 to 300 cfm. Injection of air via injection wells 18 volatilizes contaminants and forces these contaminants and contaminant-breakdown byproducts up and into venting wells 28. If employed, the fan or vacuum pump 34 assists in drawing the volatile contaminants and byproducts into venting wells 28 in a controlled manner.

In an alternative embodiment of the invention, air injection wells 18, in the absence of extraction wells, are utilized to volatilize contaminants and provoke biodegradation of contaminants. The volatilized contaminants rise to the surface and are vented to the atmosphere. Obviously, this embodiment should not be utilized when control of the vented gases is desired or required.

Figure 4:
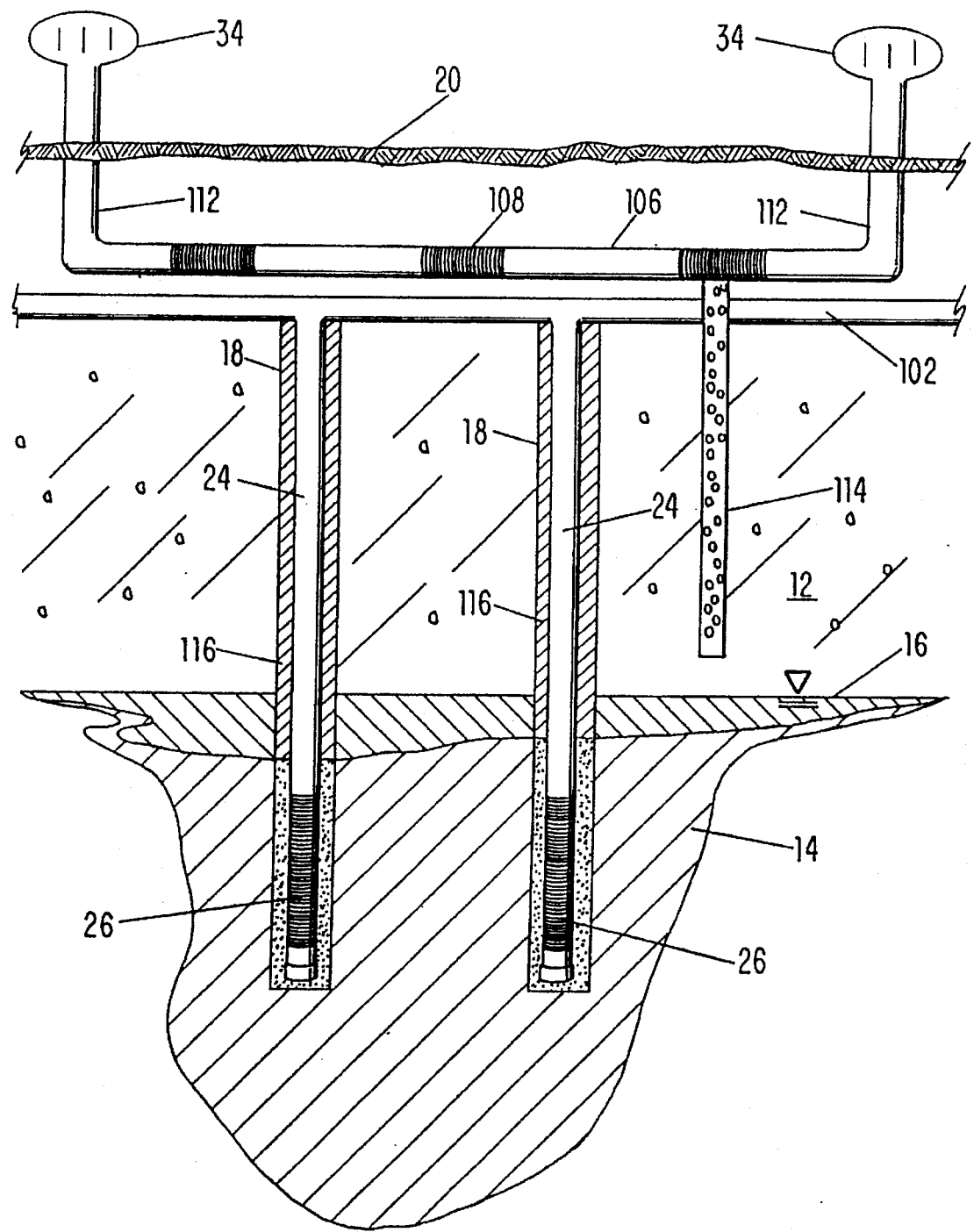
FIG. 4 is a schematic illustration in cross-section of a subterranean soil formation having a water table, and wherein an alternative method and system of the present invention are being applied.

FIG. 4 illustrates another alternative embodiment of the method and system of the present invention. In this embodiment, injection wells 18 are constructed as in the preferred embodiment illustrated in FIGS. 1 and 3. Venting laterals 106, comprising gas-impermeable piping having screens or perforations 108 therein, permit ingress of air, contaminants, and biodegradation byproducts. Venting laterals 106 are beneath surface 20 far enough to prevent migration of surface water into laterals 106. Such location eliminates the fouling of venting wells near the water table by subsurface water, and fouling of venting pumps by condensate, associated with previously existing vacuum extraction and venting systems. Venting laterals 106 additionally comprise conduits 112 leading to surface 20. Optionally, venting fans or vacuum pumps 34 are fluidly connected to one or more conduits 112.

As illustrated in FIG. 4, the alternative method and system of the invention may optionally comprise venting chimneys 114 beneath one or more lateral screens 108. Venting chimneys 114, preferably shafts filled with silica sand (or other gas-permeable, low capillary-lift material), permit upward migration of air, contaminants, and by-products, but discourage upward migration of liquid water. Venting chimneys 114 may additionally comprise (not shown) PVC piping having one or more screens or openings therein; the vertical piping may connect to venting lateral 106 or may connect to a separate venting manifold. As is readily observable by those skilled in the art, venting laterals 106 may be employed without venting chimneys 114 or with any combination of silica sand shafts, vertical PVC piping, or other venting means known in the art, depending on site stratigraphy and other factors. For example, a silica sand venting chimney may have vertical piping extending only through an upper portion of the chimney.

Figures 5, 6, 7:
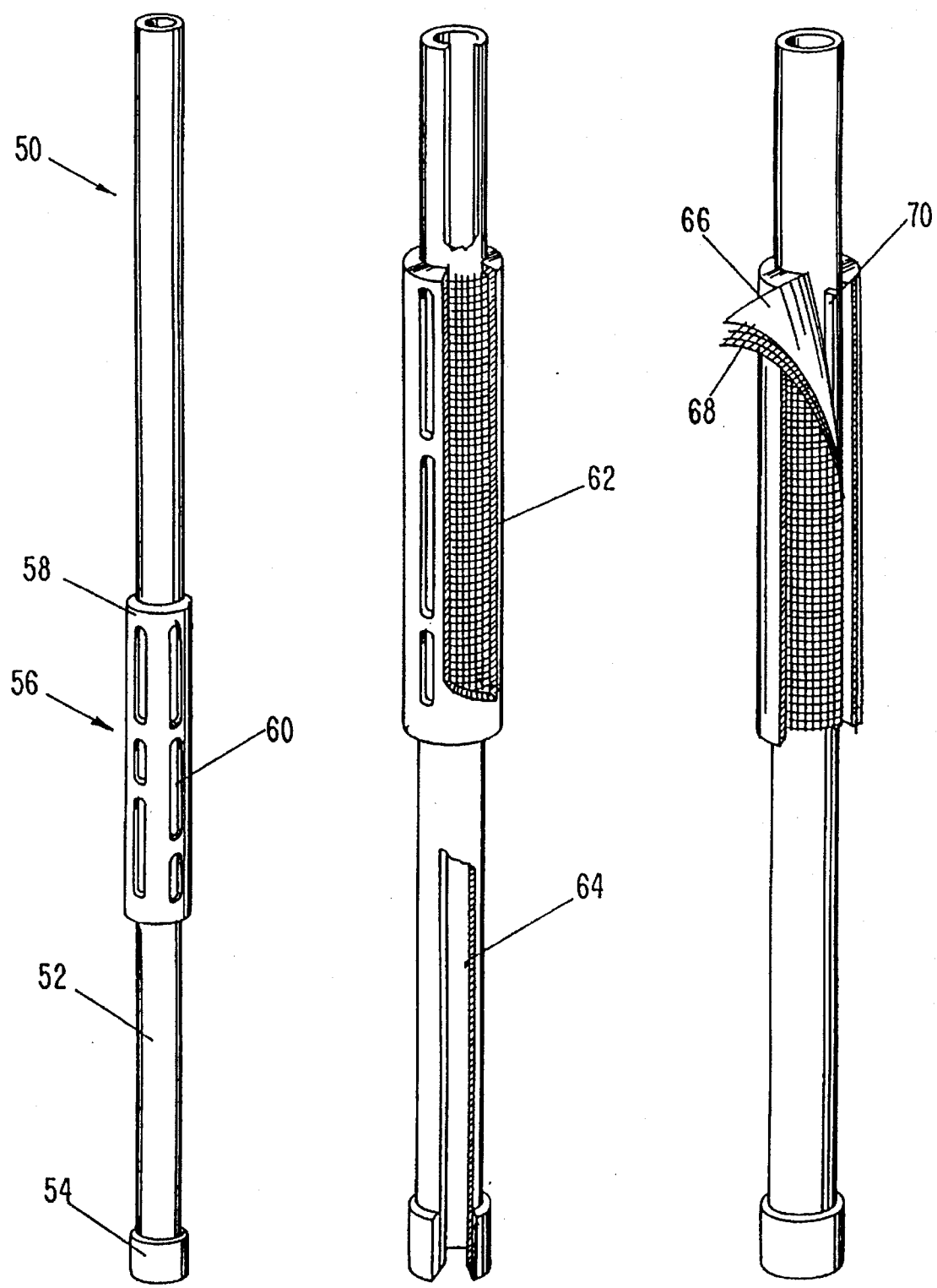
FIG. 5 is an exterior view of the free-product extraction apparatus of the invention.
FIG. 6 is an interior exposed view of the free-product extraction apparatus.
FIG. 7 is a further interior exposed view of the free-product extraction apparatus.

The gas-impermeable piping 24 and 30 of the injection and venting wells 18 and 28 and of venting laterals 106 may consist of metal or plastic piping, such as one- to two-inch PVC piping. The annulus of all wells (opening between borehole and pipe) is preferably sealed above the screens (e.g., with a bentonite/cement mixture 116) to prevent suction loss and migration of surface water and free contaminants to the subsurface.

Where a liquid contaminant is known to be present as free-product within the ground water 14 (or in the soil above the water table), the following method of separation and extraction is employed. FIG. 5 illustrates the preferred method and apparatus for free-product extraction. A free-product extractor 50 is inserted in an extended venting well 28. The extractor 50 comprises a hollow reservoir 52, end cap 54, and an entry cartridge 56. The entry cartridge 56 comprises a protector 58, outer ports 60, and a filtration screen 62. The filtration screen 62 comprises an outer layer 68 and a hydrophobic filter 66. The entry cartridge 56 covers inner ports 70 permitting passage of fluid contaminants to the hollow interior 64 of the reservoir 52. Free product extractor may be used in situ or in various configurations for surface, laboratory, or industrial use.

Non-dissolved liquid contaminant is separated from ground water 14 (or extracted from soil above the water table) by placing entry cartridge 56 in contact with the contaminant/water mixture (or contaminant/soil mixture) found at the bottom of an extended venting well 28. Alternatively, free-product extraction apparatuses 50 may be placed in bore holes of insertion wells 18, or a combination of insertion wells 18 and venting wells 28, or in entirely separate bore holes. The contaminant/water mixture contacts filtration screen 62 through outer ports 60. Subsurface fluid pressures force liquid contaminant through filtration screen 62 into the interior 64. However, water does not enter interior 64 because it cannot pass through hydrophobic filter 66. Subsurface fluid pressures, and not pumping pressures, force fluid contaminant to gradually fill reservoir 52. The reservoir 52 then is pumped and allowed to refill before further pumping. This under-pumping allows the well to retain maximum efficiency.

According to the invention, the following method is employed to extract, analyze, ferment, and reintroduce microorganisms useful in biodegradation of contaminants. Water or soil samples (or both) are taken from several contaminated zones (and, at times, from non-contaminated zones) within the site, because microbes are not uniformly distributed within a site. The samples are examined to determine the genera of microbes present and their concentrations. Microbes known or demonstrated to be useful in biodegrading the contaminant at the site are isolated and fermented to increase population. The site is then inoculated with the heightened population either through the point of contamination or through one or more injection wells 18 or venting wells 28 (or separate wells).

As the concentration of contaminant decreases, the concentration of contaminant degrading microbes must also decrease. If the rate of the microbial decrease is sufficient that it becomes apparent that the site will not reach statutory or desired limits in a rapid fashion, the preferred embodiment employs the following growth-stimulation method. Using this approach, food supplies (generally organic) or nutrients (generally inorganic) are inserted into the site using the same physical distribution of wells as is used for other aspects of this integrated remediation system. This results in a very cost effective enhancement of the rate of bioremediation without requiring any additional physical apparatus. This process takes place primarily in injection wells 18. However, if the vadose zone 12 is exceptionally dry, humidity enhancement and nutrient/food enhancement take place in the venting wells 28.

The outlets of venting wells 28 or venting laterals 106 may be connected to suitable stacks, vents, scrubbers, condensers, chemical filters and/or scavengers (not shown), to collect, dilute or vent contaminants extracted from the soil and ground water. The preferred embodiment of the biotreater uses flow rates in the air injection system which allow maximum bioremediation of the vapors so that air quality standards are not exceeded by the fluids vented by the remediation unit. However, some site conditions are such that one must vent at a heavier or faster rate, thus potentially exceeding air quality standards. Normally the present invention is operated in such a fashion that post-treatment of extracted gases is not necessary. However, the present invention provides a post-treatment method which, if necessary on the site, is very cost-effective and requires no electrical power. An example of other useful filters are activated carbon filters, prior art biotreaters, treatment by incineration, catalytic oxidation, or ultraviolet rays. These latter techniques are considerably more expensive than is the present invention.

Figure 10:
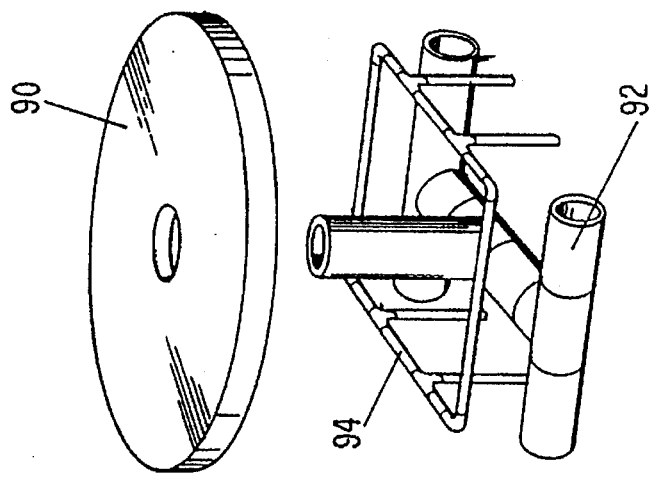
FIG. 10 is an illustration of interbasal components of the biotreater apparatus.
Figure 9:
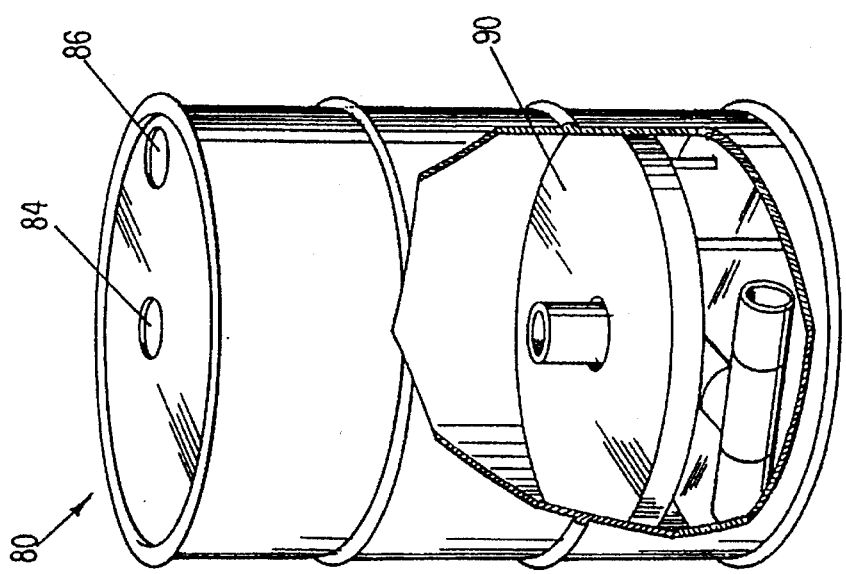
FIG. 9 is an interior exposed view of the biotreater apparatus.
Figure 8:
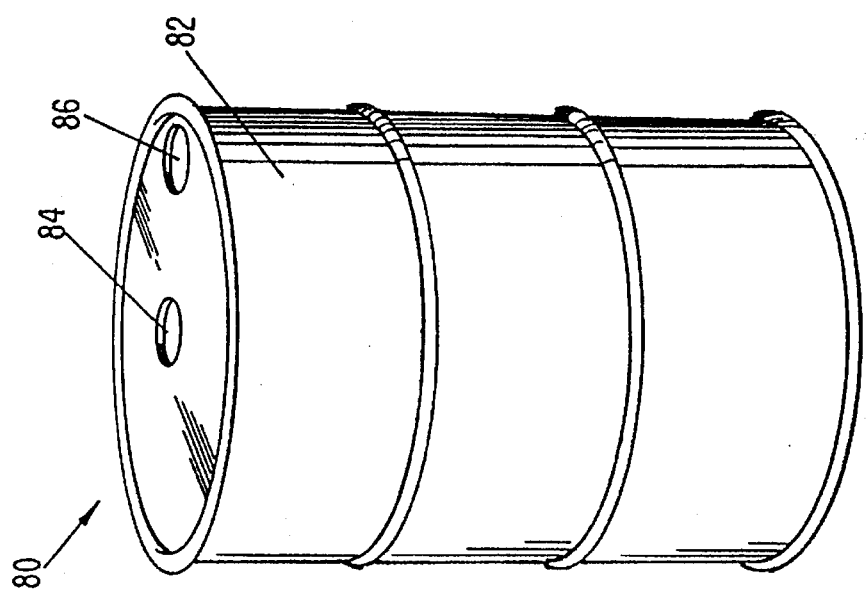
FIG. 8 is an exterior view of the biotreater apparatus of the invention.

The preferred biotreater 80 illustrated in FIGS. 8 through 10 is employed at the outlets of venting wells 28 or venting laterals 106. An air conductive pathway (not shown) is established between an outlet and diffuser 92, passing through inlet 84 into container 82, preferably a 55-gallon drum. The biotreater 80 is filled (preferably partially filled) with water impregnated with microbes determined to have a degrading effect on the contaminant being extracted. When the vacuum pump 34 is in operation, contaminated air passes into biotreater 80, bubbles up through the microimpregnated water from diffuser 92, past baffle 90 supported by stand 94, and out through biotreater outlet 86.

A plurality of biotreaters 80 may be connected in series to more efficiently decontaminate the air extracted by venting wells 28 or venting laterals 106. Biotreaters may be added or deleted from the series as contaminant concentration from the vacuum pump 34 increases or decreases. Preferably, the microorganisms placed within the biotreaters are fermented from subsurface samples, and hence are identical to the microorganisms reintroduced to the subsurface at heightened concentration.

When injection occurs via an injection well whose elements, such as liner 24 and screen 26, are confined entirely within the well bore 18, the dispersion into the aquifer 14 of injected substances is somewhat inhibited by the highly localized, almost "point source" character of the mode of injection. Such a situation is depicted in FIG. 3. Injected substances, particularly gases, tend to disperse or flow upward and outward from the bottom of the well, thus forming a zone of injection flow shaped generally like an inverted cone (with the bottom of the well 18 at the cone's apex). It may be desirable, therefore, to implement a means for increasing the volume of aquifer 14 within the injection flow zone, particularly to include portions of the aquifer very near the deepest part of the well.

Figure 11:
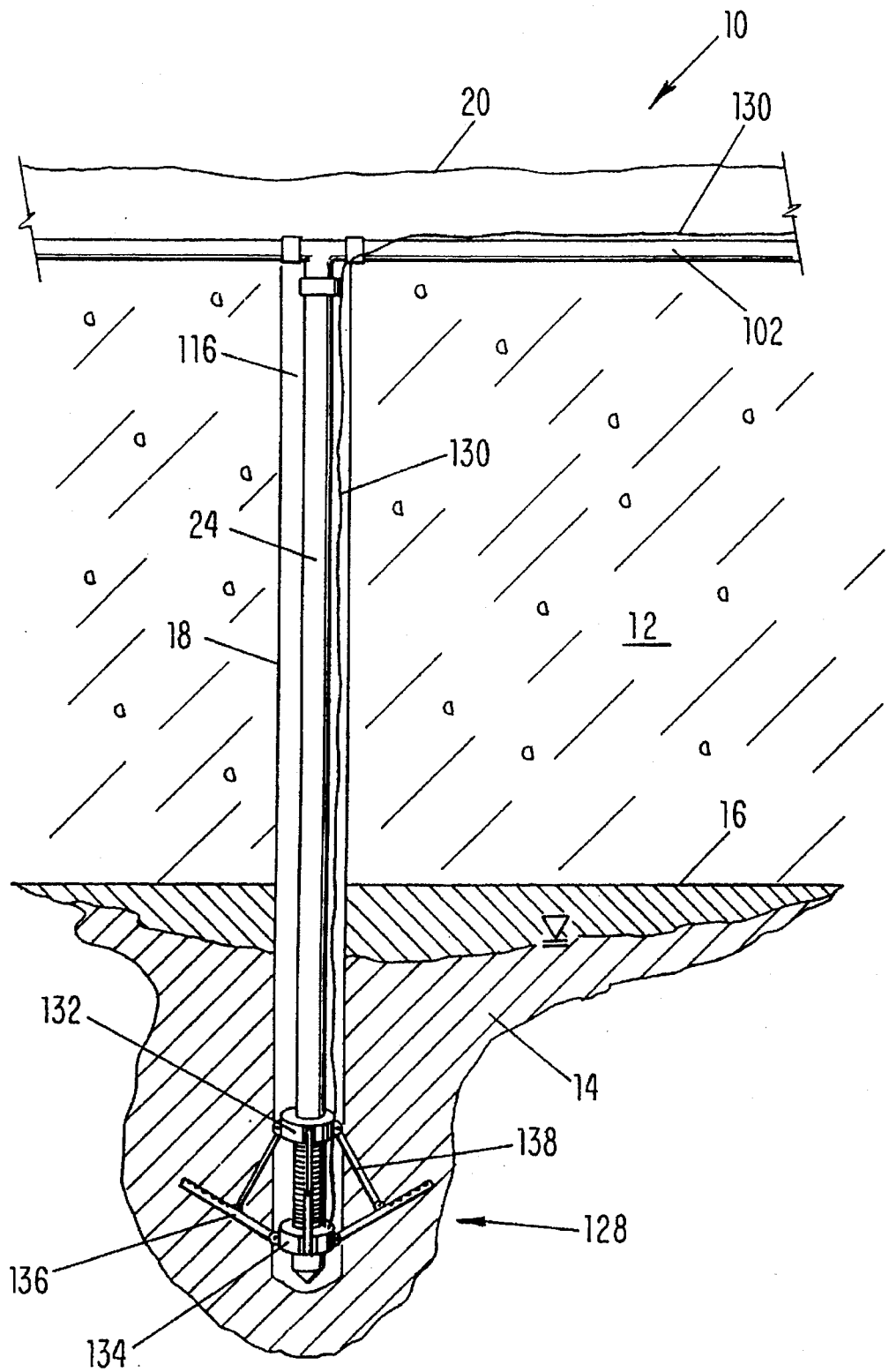
FIG. 11 is an illustration of a portion of the FIG. 3 embodiment, showing the optional injection radius extension elements of the invention.

Attention accordingly is invited to FIGS. 11–14, illustrating an alternative embodiment of the invention useful for enhancing the efficiency of the injection aspect of the invention. FIG. 11 shows an injection radius expander, depicted generally at 128, installed within the injection well 18 of the FIG. 3 embodiment. Injection radius expander 128 is installed within well bore 18 preferably near its deepest point. Expander 128 is disposed generally around liner 24, coincidentally or subsequently to the installation of liner 24 itself. The expander 128 serves to provide lateral injection of substances radially outward from lower portions of a well 128.

The principal components of expander 128 are shown in FIG. 11, and include upper slip ring 132, lower attachment ring 134, and at least one (and preferably three to five) radial injection tube 136 with associated extension brace 138. These principal components are comprised of strong, durable, corrosion-resistant materials, such as stainless steel or the like. Both slip ring 132 and attachment ring 134 are generally annular, with inside diameters conforming substantially to the outside diameter of well liner 24. Slip ring 132 is not fixed to liner 24, but rather is slidable axially along liner 24. Attachment ring 134, however, is securely (but perhaps temporarily) attached to the liner 24 so as not to be slidable along it. Radial injection tube 136 and extension brace 138 can be described as rigid rods, although radial injection tube 136 is hollow. Extension brace 138 is hingably connected to upper slip ring 132 and also is hingably connected to radial injection tube 136. Radial injection tube 136 is hingably connected to attachment ring 134. By this system of hingable connections, extension brace 138 and radial injection tube 136 are freely movable, with respect to each other, in the vertical plane containing them.

The operation of expander 128 readily can be understood by analogy to the operation of a common umbrella. In the analogy, the umbrella is upside-down and minus its canopy. The invention's well liner 24 is compared to the umbrella handle. Each radial injection tube 136 is analogized to the rigid ribs of the umbrella which support the umbrella canopy in its open position. In the "closed" position of this alternative embodiment, each extension brace 138 and its corresponding connected radial injection tube 136 are both vertical, with their mutual connection falling very approximately halfway between slip ring 132 and attachment ring 134 (which rings are maximally separated). The closed position fosters easy placement of the expander 128 within the confines of the well 18. Because attachment ring 134 does not slide up or down, as the slip ring 132 is slidably moved down the "handle" or liner 24 towards the radial injection tubes 136, the hinge between the extension brace 138 moves radially outward, causing the both the brace 138 and the tube 136 also to fold radially outward away from the liner 24, thus "opening" an array of one or more tubes 136, as shown in FIGS. 11, 13 and 14.

Once opened up within the aquifer 14, the expander serves to more widely disperse the injected substances by lengthening the radius of the "cone" of injection flow. In this alternative embodiment, substances are continued to be injected down the well 18 for release through screen 26 or other perforations in liner 24. But such injection may be supplemented by the injection of substances (typically at high pressure and low volume) through at least one flexible feed tube 130, which is disposed down the well 18 and leading to the surface. Feed tube 130 is in fluid connection with each radial injection tube 136, such that substances injected down feed tube 130 flow into and are emitted from the radial injection tube 136.

Figure 12:
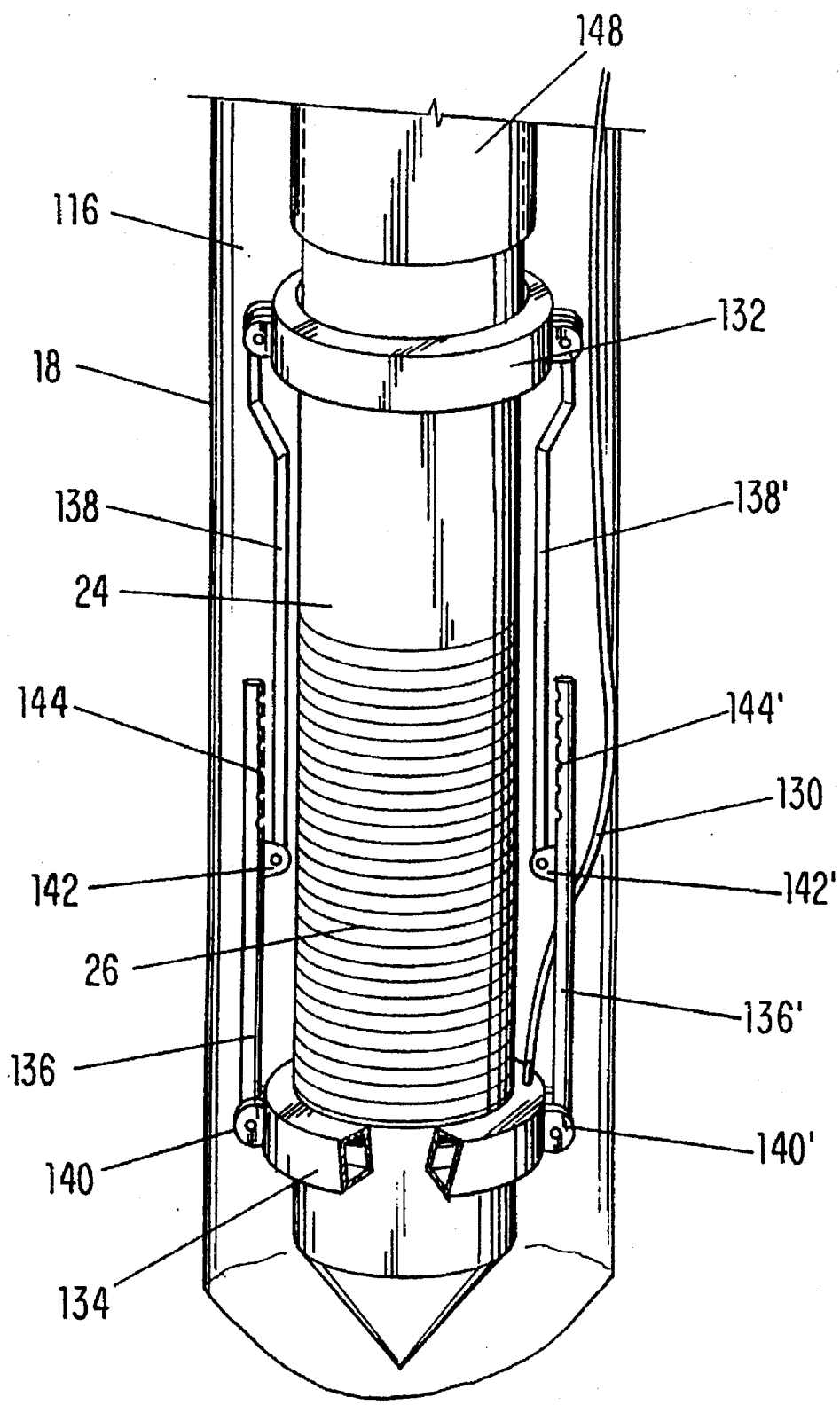
FIG. 12 is an enlarged view of a portion of the FIG. 11 embodiment, showing the injection radius extension elements in a collapsed position.
Figure 13:
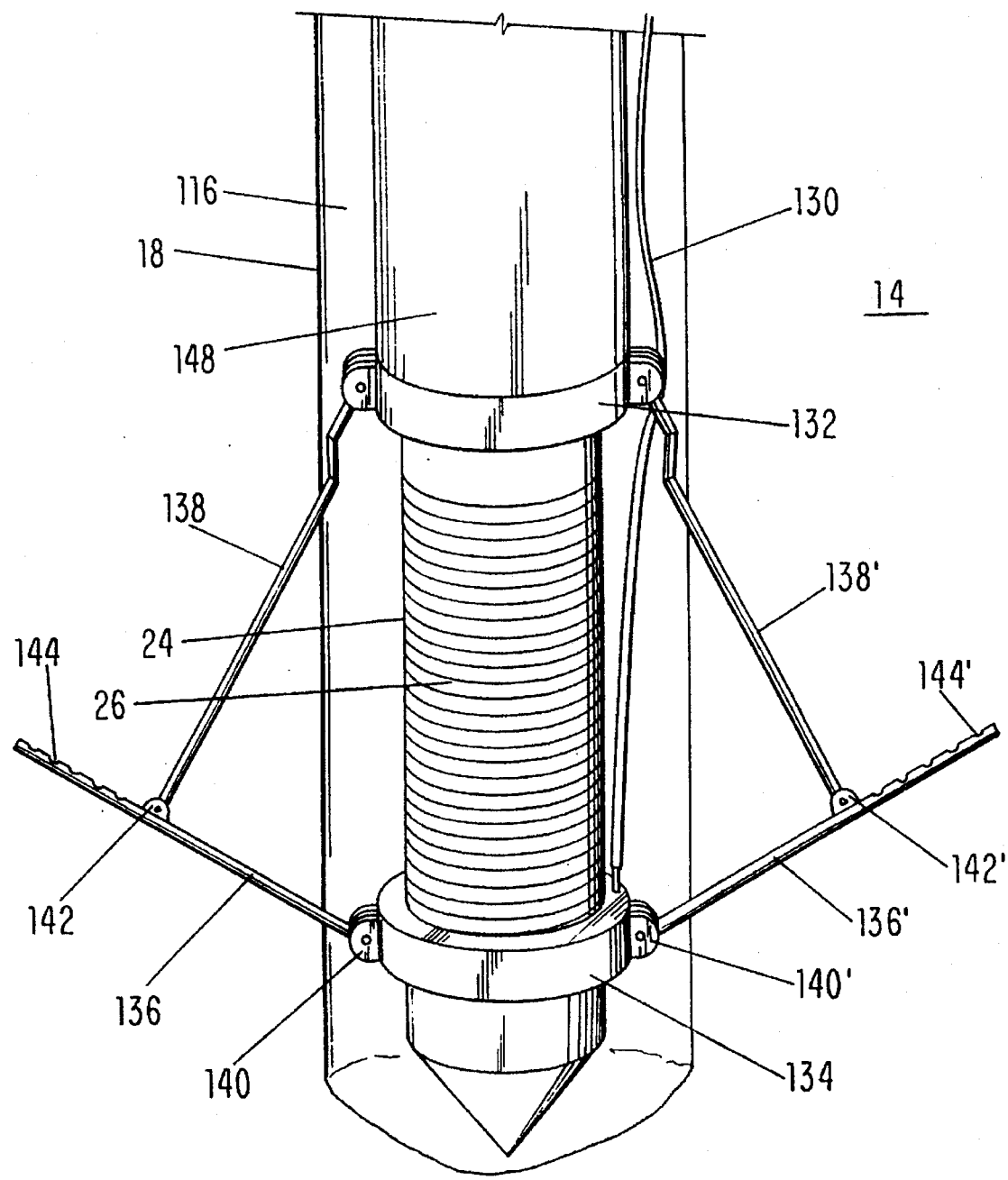
FIG. 13 is an additional view of the FIG. 12 embodiment, showing the injection radius extension elements in an extended position.
Figure 14:
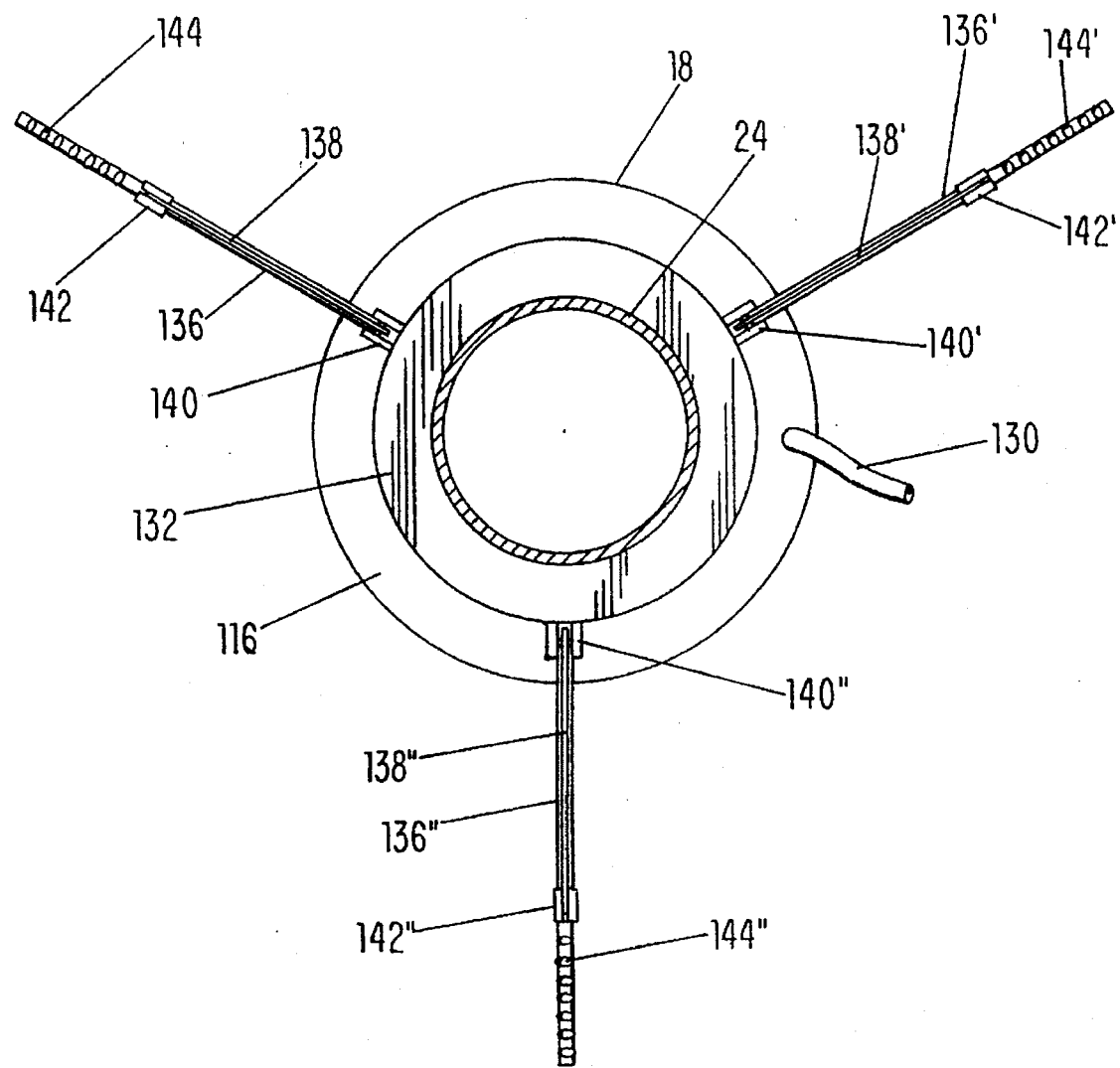
FIG. 14 is a top view of the embodiment of FIG. 13.

FIGS. 12-14 are enlarged views of the expander 128, detailing it major components and further disclosing its function. FIG. 12 shows the expander 128 disposed in its closed position around liner 24; FIG. 13 shows it in an "open" or extended position.

Attachment ring 134 is fixed to liner 24 in a manner preventing attachment ring from moving up or down liner 24. Attachment ring 134 is hollow or otherwise includes interior passageways in fluid connection with feeder tube 130 which has a fitting through the wall of the ring 134. Upper slide ring 132, which can slide up or down liner 24, is shown at or near its maximum positional distance from attachment ring 134.

For the sake of illustrative clarity, FIGS. 12 and 13 depict only two sets of radial injection tubes 136,136' and extension braces 138,138'; FIG. 14 depicts three sets. It will be understood, however, that the objects and advantages of this embodiment of the invention may be realized using any number of radial injection tubes 136,136', although three or four, and typically no more than six, are preferred. Description of one radial injection tube 136, and its associated elements and use, serves to describe them all.

Radial injection tubes 136,136' are rigid hollow tubes. Cylindrical tubes will suffice, but it may be advantageous to utilize tubes with a triangular, oval, or other cross section which fosters movement of tubes 136,136' through the material of the aquifer 14. (Sharp edges may also be installed on the exterior of a cylindrical tube for the same reason.) Radial injection tubes 136,136' may have openings at their distal ends, or along their lengths, or both, as depicted at orifices 144,144' in FIGS. 12-14.

As shown in FIGS. 12-14, extension rods 138,138' are connected to radial injection tubes 136,136' by hinges 142, 142' Hinges 142,142' permit movement of rods 138,138' and tubes 136,136' with respect to each other but preferably within the geometric plane defined by the rod and tube. Each extension brace 138 similarly is hingably connected to sliding ring 132 using hinges disposed radially about sliding ring 132. Proximal ends of radial injection tubes 136,136' likewise are hingably connected about the circumference of attachment ring 134 by means of tube hinges 140,140'. Tube hinges 140,140' are a type which permit the hollow interiors of radial injection tubes 136,136' to remain in continuous fluid communication with the interior passageway of attachment ring 134 without regard for the movement of tubes 136,136' with respect to attachment ring 134.

Operation of this alternative embodiment is described with reference first to FIG. 12. The expander is disposed within well 18 in the closed position shown in FIG. 12. After the expander is positioned at the desired location (with attachment ring 134 suitably affixed to liner 24), sleeve pipe 148 is lowered down the well 18 and around liner 24. Sleeve pipe 148 is lowered until it contacts the upper surface of slip ring 132, at which time sleeve pipe 148 is forcibly driven downward, preferably hydraulically by means known in the art. As sleeve pipe 148 is driven downward, it pushes slip ring 132 ahead of it, which in turn causes all extension rods 138,138' and radial injection tubes 136,136' to pivot in vertical planes radially outward from liner 24, by the action of hinges 142,142', tube hinges 140,140' and the hinges connecting rods 138,138' to slip ring 132. Extension rods 138,138' and radial injection tubes 136,136' thus are forced through the surrounding aquifer medium; densely packed aquifer material will require that sleeve pipe 148 be hydraulically rammed with comparatively elevated force. Continued downward motion of sleeve pipe 148 results in a continuously decreasing angle between extension rods 138, 138', until the assembly obtains the configuration shown in FIGS. 13 and 14. The motion potentially can continue until radial injection tubes 136,136' have reached a horizontal position; the precise angular positioning of tubes 136,136' is controllable through the manipulation of sleeve pipe 148.

With the apparatus configured as depicted in FIGS. 13 and 14, air, oxygen, oxygen-containing substances and the like may be pumped down feed tube 130. These substances move through feed tube 130 and through the interior of attachment ring 134, through tube hinges 140,140', and finally through the radial injection tubes 136,136'. The substances are then emitted through the orifices 144,144' in tubes 136,136' for broadened dispersion into the aquifer. Preferably, substances are simultaneously injected from the surface through screen 26 via the interior of liner 24.

Figure 15:
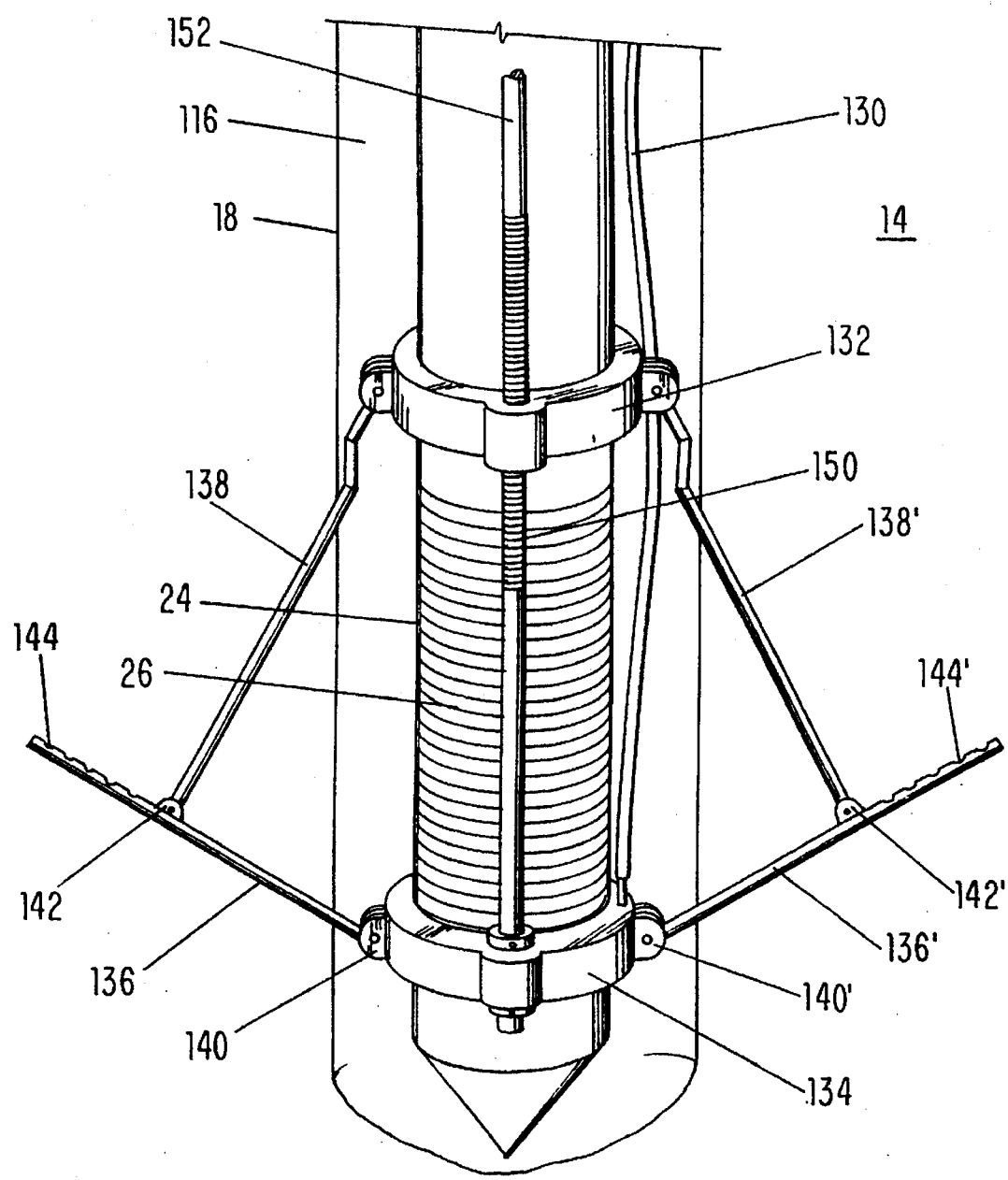
FIG. 15 illustrates an alternative embodiment of the embodiment of FIG. 13.

FIG. 15 illustrates an alternative embodiment of the expander 128 shown in FIG. 11. This alternative embodiment is identical to the embodiment of FIGS. 12-14, except with respect to the mode of moving slip ring 132 downward. In this alternative embodiment, slip ring 132 is vertically penetrated by at least one threaded hole, through each of which a threaded jack screw 150 is screwed. One (or more) jack screw 150 also passes through an unthreaded hole vertically penetrating attachment ring 134 and so aligned as to cause the vertical positioning of jack screw 150 as shown. Jack screw 150 is free to rotate in the hole through attachment ring 134, but is fitted with retaining washers or other means known in the art for preventing jack screw 150 from moving axially upward or downward with respect to attachment ring 134. Accordingly, as shank 152 of jack screw 150 is rotated, by mechanical and/or electrical means known in the art, the screwing interaction between jack screw 150 and slip ring 132, together with the vertical immobility of jack screw 150, causes slip ring 132 to be mechanically drawn toward attachment ring 134, resulting in the "opening" of the radial injection tubes 136,136', as previously described. Counter-rotation of the jack screw 150 will retract the tubes 136,136' inward, as slip ring 132 is forced upward by the screwing action.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

We claim:

1. An apparatus for laterally dispersing substances outward from an injection well, said apparatus comprising:

means for transporting said substances vertically downward into said injection well;

at least one injection tube vertically disposable within said injection well and in fluid communication with said means for transporting; and means mounted vertically above said injection tube for moving said injection tube radially outward from said injection well.

2. The apparatus of claim 1 wherein said means for transporting comprises a flexible feeder tube.

3. The apparatus of claim 1 wherein said means for transporting comprises a well liner.

4. The apparatus of claim 1 wherein said means for moving said injection tube radially outward comprises means for pivoting said injection tube outward from said injection well.

5. The apparatus of claim 4 wherein said means for pivoting comprises:

a rigid member vertically disposed in said well; and hinge means for connecting said injection tube to said rigid member.

6. The apparatus of claim 5 wherein said rigid member comprises a well liner.

7. The apparatus of claim 6 further comprising:

a slip ring member slidably disposed around said rigid member;

extension rod means hingably connected to said injection tube and hingably connected to said slip ring member; and means for vertically sliding said slip ring member along said rigid member.

* * * * *